UNITED STATES PATENT OFFICE.

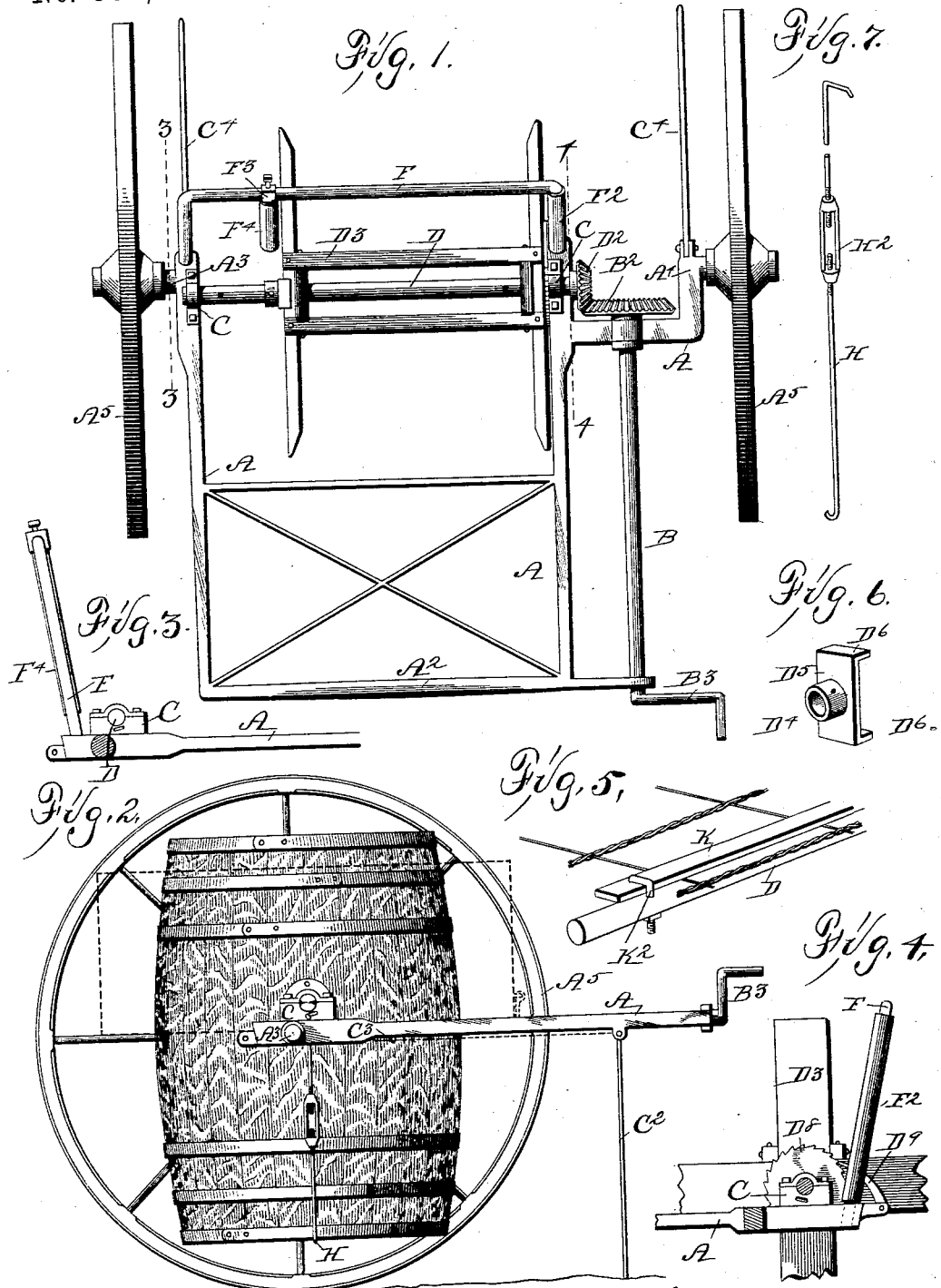

JOHN W. KELLER, OF LORIMOR, IOWA.

REEL-CARRIER.

SPECIFICATION forming part of Letters Patent No. 580,177, dated April 6, 1897.

Application filed October 17, 1896. Serial No. 609,253. (No model.)

*To all whom it may concern:*

Be it known that I, JOHN W. KELLER, a citizen of the United States, residing at Lorimor, in the county of Union and State of Iowa, have invented a new and useful Hand Machine for Stretching, Reeling, and Carrying Fence-Wire, &c., of which the following is a specification.

My object is to provide a device of this class that shall be of simple, cheap, strong, and durable construction and which may be advantageously used in reeling and unreeling wire, &c., and stretching and tightening fence-wires; and my object is, further, to provide means whereby a spool of wire may be readily and quickly attached to or detached therefrom and the frame and wheels of the device be employed to carry barrels, boxes, &c., or to support a barrel in position where it may be rapidly rotated for the purpose of mixing paints, &c.

My invention consists in certain details of construction, arrangement, and combination of parts, as hereinafter set forth, pointed out in my claims, and illustrated in the accompanying drawings, in which—

Figure 1 shows a top or plan view of the device adapted for reeling up wire. Fig. 2 shows a side elevation of the device, having a barrel supported in position thereon and showing the location of a box on the frame by dotted lines. Fig. 3 shows a detail sectional view illustrating the wire-guiding device and taken on line 3 3 of Fig. 1. Fig. 4 shows a detail end view of the shaft that supports the reel and the ratchet-wheels thereon. Fig. 5 shows a detail perspective view illustrative of a woven fence secured to the reel-shaft. Fig. 6 shows in perspective the device for connecting the shaft and spool.

Referring to the accompanying drawings, the reference-letter A is used to indicate a rectangular frame having a handle $A^2$ at one end and at its opposite end two integral stub-axles $A^3$ and $A^4$, upon which wheels $A^5$ are rotatably mounted.

B indicates a shaft mounted in suitable bearings at one side of the frame and having a bevel gear-wheel $B^2$ on one end and a crank $B^3$ on the other end. On top of the side pieces of the frame, at a point slightly in the rear of the axles, are two bearing-boxes C.

$C^2$ indicates a leg or support hinged to the frame to support the same in a horizontal position. It may be held up by a hook $C^3$ when not in use, and $C^4$ indicates bars hinged to the forward end of the frame to engage the ground-surface, and thus anchor the device when used to stretch wire, to overcome the resistance caused by stretching the wires.

To adapt the device for reeling, unreeling, or stretching wire, I have provided a shaft D, to be mounted in the bearing-boxes C. On one end of the shaft is a bevel gear-wheel $D^2$ to mesh with the gear-wheel $B^2$. A spool $D^3$ is placed on the shaft to receive the wire. It is held in place and against rotation relative to the shaft by means of a collar $D^4$, slidingly mounted on the shaft and having a flat plate $D^5$ at one end which has overlapping edges $D^6$ to engage the spool. The collar is held in place on the shaft by means of a pin $D^7$, passed through openings in the collar and shaft.

It is obvious that a spool of wire may be readily and quickly placed in position on the machine and that it may be rotated to reel up or stretch wire by the operator with one hand, while he employs his other hand in advancing the machine. When used as a stretcher, the anchor-bars are permitted to engage the ground-surface, and thus hold the machine in place.

$D^8$ indicates a ratchet-wheel on the shaft D, and $D^9$ a pawl to engage said wheel.

I have also provided a device for guiding wire to the reel, so that it cannot become caught in the cross-pieces at the end of the spool. It comprises an arch F with its ends secured to the ends of the side pieces of the machine-frame. On one of the uprights of the arch is a sleeve $F^2$, loosely mounted, and a rod $F^3$ is adjustably clamped to the top of the arch and provided with a rotatable sleeve $F^4$. Thus the wire is directed to the spool from either side of the machine.

When it is desired to use the device for carrying barrels, boxes, &c., the shaft D is detached and a box or other article may be placed on the frame and the device used as an ordinary hand-cart. A barrel may be carried by means of trunnions on its sides admitted into the bearing-boxes of the frame. I preferably provide a device for relieving the band-staves of strain when thus suspended, consisting of the rods H, having a hook at each end to engage the frame and the bottom edge of the barrel and a turnbuckle H² to adjust its length.

I have also provided means for winding woven fences and the like directly upon the shaft. For this purpose I use a flat bar K to be placed on top of the end of the fence which is rested on the said shaft. Bolts K², having their tops bent at right angles, are passed through openings in the axle with said ends overlapping the bar. Nuts on the lower ends of the bolts provide means whereby the bar may be firmly clasped to the shaft.

The device may easily be adapted for supporting barrels in which paint or the like is to be mixed. These barrels have trunnions on their central portions and a crank on one of the trunnions. Said trunnions are placed in the bearing-boxes and one of the wheels removed to permit the crank to be rotated.

Having thus described my invention, what I claim as new therein, and desire to secure by Letters Patent of the United States therefor, is—

1. A wire reel and stretcher, comprising a frame, two stub-axles thereon, wheels on the axles, a shaft mounted at one side of the frame, a crank on one end of the shaft and a bevel gear-wheel on the other, bearing-boxes on the side pieces of the frame, a shaft to be mounted therein, a bevel gear-wheel on its end to mesh with the aforesaid bevel gear-wheel, and means for holding a spool to the shaft, an arch fixed to the frame, a roller on one of its upright parts, a rod adjustably fixed to its top part, and a rotatable sleeve or roller on said rod, for the purposes stated.

2. In a wire reel and stretcher, the combination with a shaft designed to be rotated to reel up wire &c. of a flat bar, bolts having one end bent at right angles and the other screw-threaded, and passed through openings in the shaft and nuts on the bolts to engage the under surface of the shaft and draw the bar close to the shaft, for the purposes stated.

JOHN W. KELLER.

Witnesses:
E. T. DUFUR,
A. W. H. ORR.